(12) United States Patent
Chen et al.

(10) Patent No.: US 8,477,930 B2
(45) Date of Patent: Jul. 2, 2013

(54) CASE ASSEMBLY FOR ELECTRONIC APPLIANCE

(75) Inventors: Jung-Pin Chen, Kaohsiung Hsien (TW); Shu-Chen Lin, Kaohsiung Hsien (TW); Shan-Yao Chen, Kaohsiung Hsien (TW)

(73) Assignee: King Slide Works Co., Ltd., Kaohsiung Hsien (TW)

( * ) Notice: Subject to any disclaimer, the term of this patent is extended or adjusted under 35 U.S.C. 154(b) by 821 days.

(21) Appl. No.: 12/699,372

(22) Filed: Feb. 3, 2010

(65) Prior Publication Data

US 2010/0201235 A1 Aug. 12, 2010

(30) Foreign Application Priority Data

Feb. 12, 2009 (TW) .............................. 98104567 A

(51) Int. Cl.
*H04M 9/00* (2006.01)
(52) U.S. Cl.
USPC ............... 379/433.11; 455/575.1; 379/428.01
(58) Field of Classification Search
USPC ........ 379/433.11, 433.01, 428.01; 455/575.1, 455/90.3
See application file for complete search history.

(56) References Cited

U.S. PATENT DOCUMENTS

| | | | |
|---|---|---|---|
| 7,002,073 B2* | 2/2006 | Lai et al. | 174/50 |
| 7,092,520 B2* | 8/2006 | Fuhrmann et al. | 379/433.11 |
| 7,933,401 B2* | 4/2011 | Ho | 379/429 |
| 8,102,644 B2* | 1/2012 | Arita | 361/679.01 |
| 2001/0024947 A1* | 9/2001 | Fuhrmann et al. | 455/90 |
| 2002/0085709 A1* | 7/2002 | Hsu | 379/433.11 |
| 2002/0131584 A1* | 9/2002 | Mote et al. | 379/419 |
| 2002/0159586 A1* | 10/2002 | Chiou | 379/433.11 |
| 2003/0095656 A1* | 5/2003 | Sommer | 379/419 |
| 2003/0211835 A1* | 11/2003 | Pan et al. | 455/90.3 |
| 2004/0203514 A1* | 10/2004 | Cheng et al. | 455/90.3 |
| 2005/0271200 A1* | 12/2005 | Hu et al. | 379/433.11 |
| 2009/0270136 A1* | 10/2009 | Su et al. | 455/572 |

* cited by examiner

*Primary Examiner* — Olisa Anwah
(74) *Attorney, Agent, or Firm* — Rosenbreg, Klein & Lee

(57) ABSTRACT

A case assembly for electronic appliance includes a first case having a plurality of engaging members and each engaging member includes two clamping protrusions. Each clamping protrusion includes a supporting portion and a protruding portion. A space is defined between the two clamping protrusions. A second case includes multiple ports and each port has a shoulder defined in an inside thereof and the shoulder is located corresponding to the protruding portions of the clamping protrusions. Multiple positioning members each have an insertion portion and a head. A transverse width of the opening of the space is smaller than a width of the insertion portion. When the insertion portion of each of the positioning members is inserted into the space corresponding thereto, the clamping protrusions are expanded outward by the positioning member, and the protruding portions are engaged on the shoulder of the second case.

12 Claims, 4 Drawing Sheets

CASE ASSEMBLY FOR ELECTRONIC APPLIANCE

FIELD OF THE INVENTION

The present invention relates to a case assembly, and more particularly, to a case assembly for electronic appliance and the case assembly is easily assembled and disassembled.

BACKGROUND OF THE INVENTION

Generally speaking, a conventional case assembly for electronic appliance relies on the connection of multiple bolts which decide the quality of the case assembly. For instance, the reliability of the case assembly depends on the connection of the bolts and the cases, however, the bolts have to be threadedly connected to the cases one by one and which is a time-consuming task. The threaded holes can be easily broken and affect the connection of the bolts which may drop from the cases. U.S. Pat. No. 7,092,520 to Fuhrmann discloses the invention related to the connection of the bolts and the cases.

SUMMARY OF THE INVENTION

The present invention intends to provide a case assembly which provides the assemblers or users a convenient feature to easily assemble or disassemble the cases.

The present invention relates to a case assembly for electronic appliance, and the case assembly comprises a first case having a plurality of engaging members and each engaging member includes two clamping protrusions which are located apart from each other. Each clamping protrusion includes a supporting portion and a protruding portion which extends laterally from the supporting portion. A space is defined between the two clamping protrusions and the protruding portions of the clamping protrusions define an opening of the space. A second case is connected to the first case and an interior space is defined between the first and second cases. The second case includes a plurality of ports defined therethrough which are located corresponding to the engaging members. Each port has a shoulder defined in an inside thereof and the shoulder is located corresponding to the protruding portions of the clamping protrusions. A number of positioning members each have an insertion portion and a head opposite to the insertion portion. A transverse width of the opening of the space is smaller than a width of the insertion portion. The insertion portion of each of the positioning members is inserted into the space corresponding thereto and the clamping protrusions are expanded outward by the positioning member. The protruding portions are engaged on the shoulder of the second case.

The two clamping protrusions are inclined an angle toward each other.

The insertion portion of each of the positioning members includes a straight portion and a gradually-narrowed portion which extends from the straight portion. The gradually-narrowed portion is located corresponding to the space between the two clamping protrusions corresponding thereto. A minimized width of the gradually-narrowed portion is smaller than the transverse width of the opening of the space.

Each of the clamping protrusions has a protrusion which is located to the opening of the space corresponding thereto. The straight portion of each of the insertion portions includes a recess which is located corresponding to the protrusion of the clamping protrusion. The protrusions of the clamping protrusion are engaged with the recesses when the positioning member is inserted into the space.

The clamping protrusions are made of flexible material and extend from the first case.

The width of each of the ports in the second case is larger than the width between two respective outsides of the two protruding portions the clamping protrusions.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
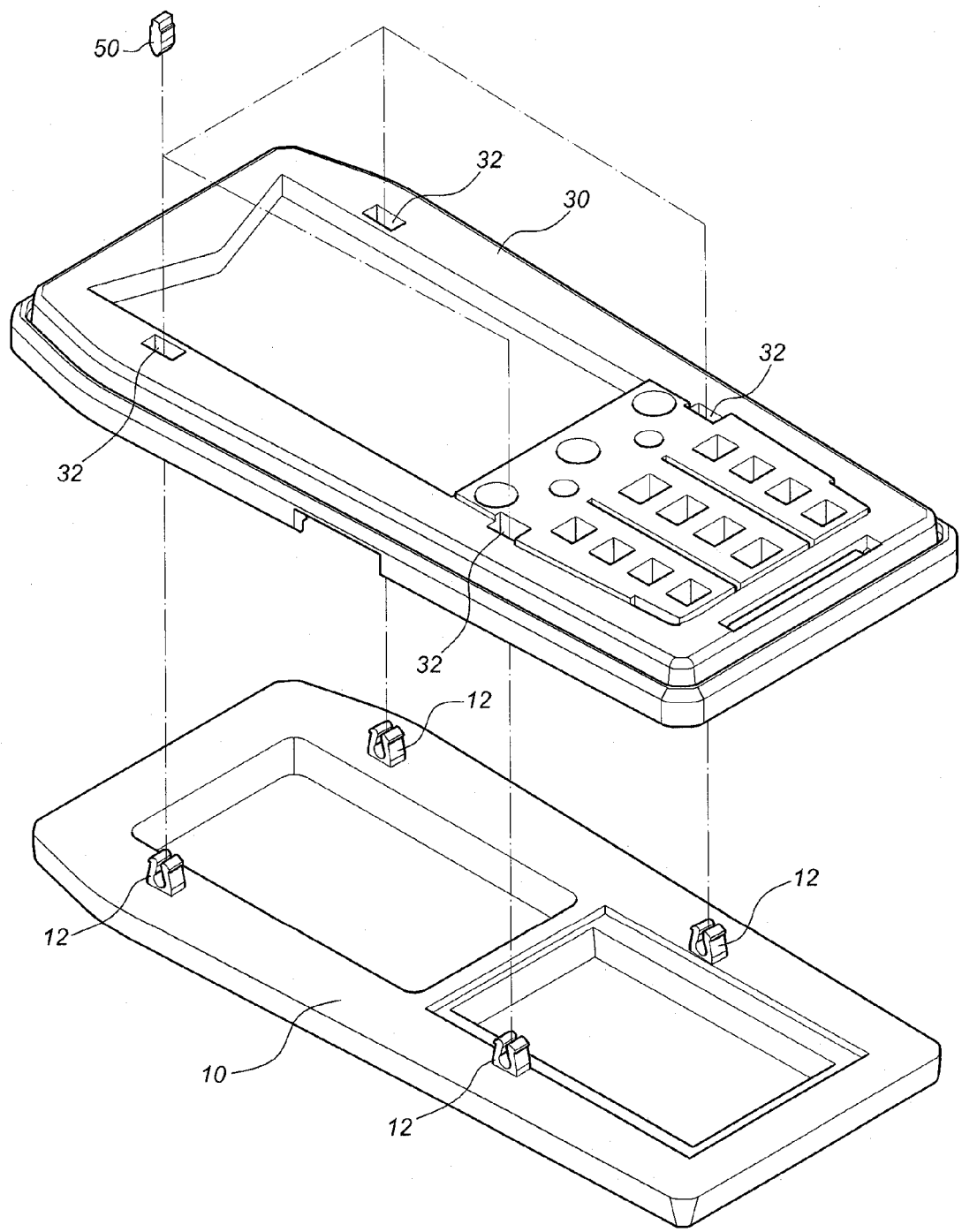
FIG. 1 is an exploded view to show the case assembly of the present invention.
Figure 2:
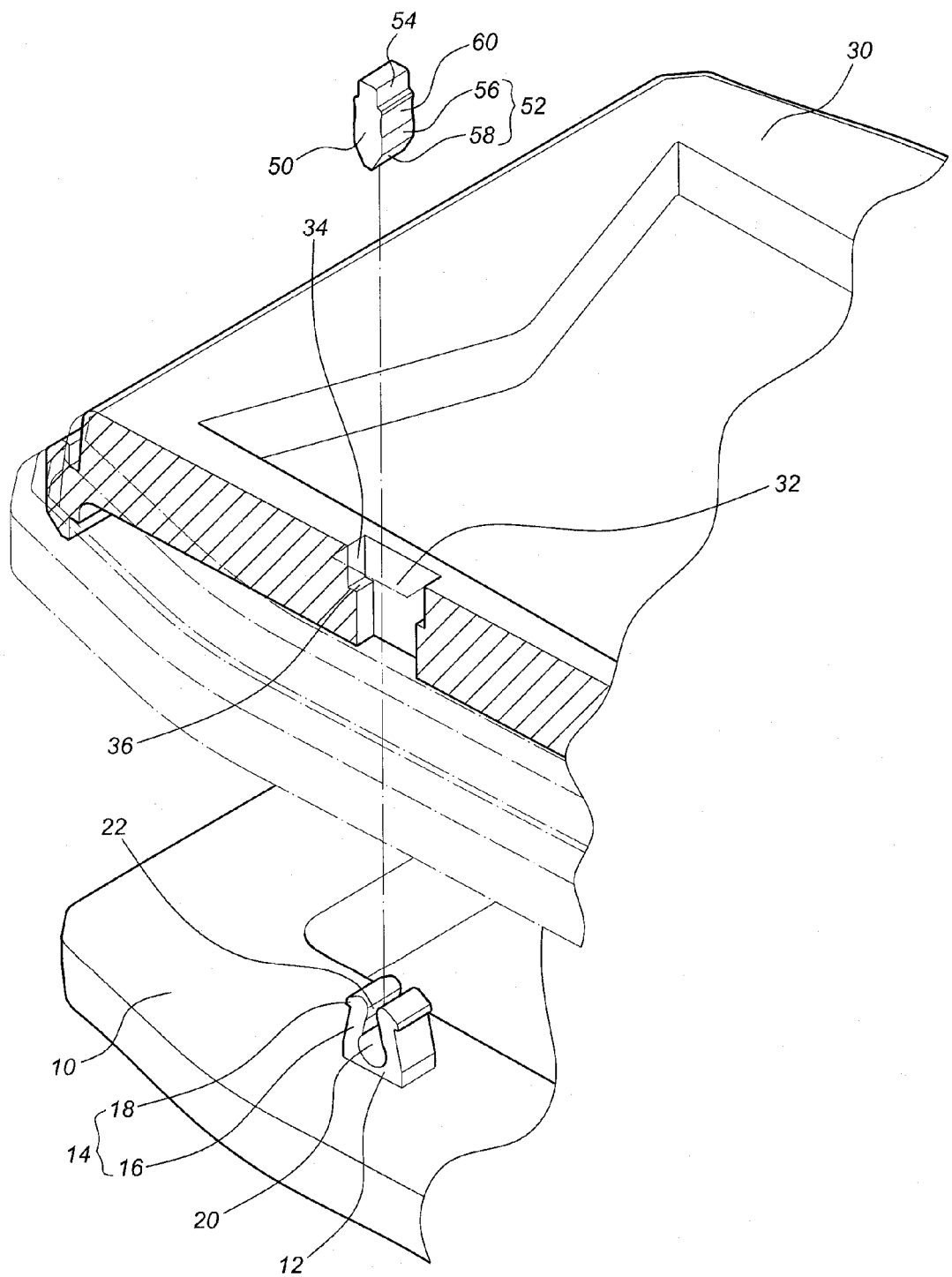
FIG. 2 is a partial and enlarged exploded view to show a portion of the case assembly of the present invention.

Referring to FIGS. 1 and 2, the case assembly of the present invention comprises a first case 10, a second case 30 and a plurality of positioning members 50.

The first case 10 includes a plurality of engaging members 12 thereon. Each engaging member 12 includes two clamping protrusions 14 which are located apart from each other. Each clamping protrusion 14 includes a supporting portion 16 and a protruding portion 18 which extends laterally from the supporting portion 16. A space 20 is defined between the two clamping protrusions 14. The protruding portions 18 of the clamping protrusions 14 define an opening of the space 20. Preferably, the clamping protrusions 14 are made of flexible material and extend from the first case 10. Preferably, each of the clamping protrusions 14 has a protrusion 22 which is located close to the opening of the space 20 corresponding thereto.

The second case 30 includes a plurality of ports 32 defined therethrough which are located corresponding to the engaging members 12. The width of each of the ports 32 in the second case 30 is larger than the width between two respective outsides of the two protruding portions 18 of the clamping protrusions 14. Each port 32 has a shoulder 36 defined in an inside 34 thereof. The shoulder 36 is located corresponding to the protruding portions 18 of the clamping protrusions 14.

Figure 3A:
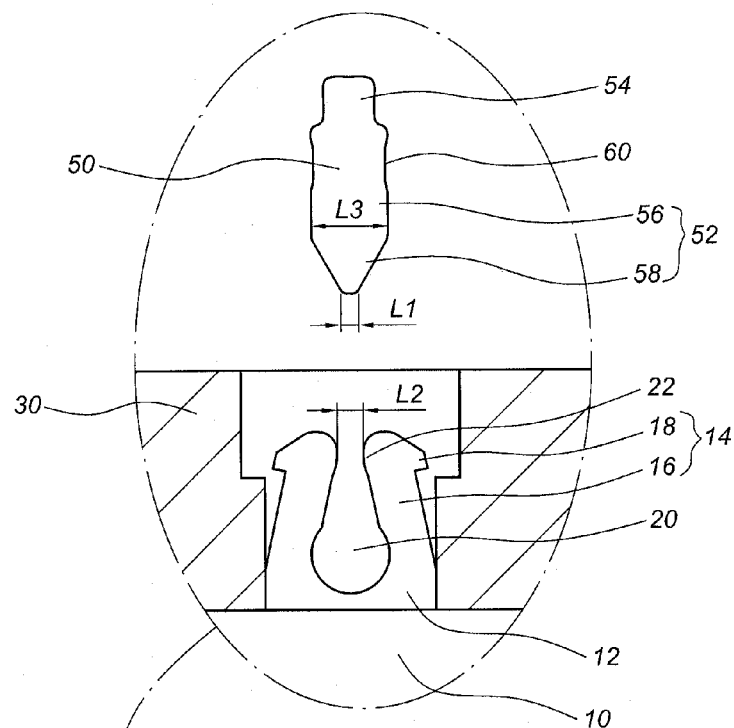
FIG. 3a is an enlarged view to show the circled portion in FIG. 3.

The plurality of positioning members 50 are cooperated with the engaging members 12 of the first case 10. Each positioning member 50 has an insertion portion 52 and a head 54 which is located opposite to the insertion portion 52. The insertion portion 52 of each of the positioning members 50 includes a straight portion 56 and a gradually-narrowed portion 58 which extends from the straight portion 56. The gradually-narrowed portion 58 is located corresponding to the space 20 between the two clamping protrusions 14 corresponding thereto. When the insertion portion 52 of each of the positioning members 50 is inserted into the space 20 corresponding thereto and the clamping protrusions 14 are expanded outward by the positioning member 50, the protruding portions 18 are engaged on the shoulder 36 of the second case 30. The minimized width L1 of the gradually-narrowed portion 58 is smaller than the transverse width L2 of the opening of the space 20, as shown in FIG. 3a. In this embodiment, the straight portion 56 of the insertion portion 52 includes a recess 60 which is located corresponding to the protrusion 22 of the clamping protrusion 14. The protrusions 22 of the clamping protrusion 14 are engaged with the recesses 60 when the positioning member 50 is inserted into the space 20.

In this embodiment, the two clamping protrusions 14 are inclined an angle toward each other such that the transverse width L2 of the opening of the space 20 is smaller than the width L3 of the straight portion 56 of the insertion portion 52, as shown in FIG. 3a.

Figure 3:
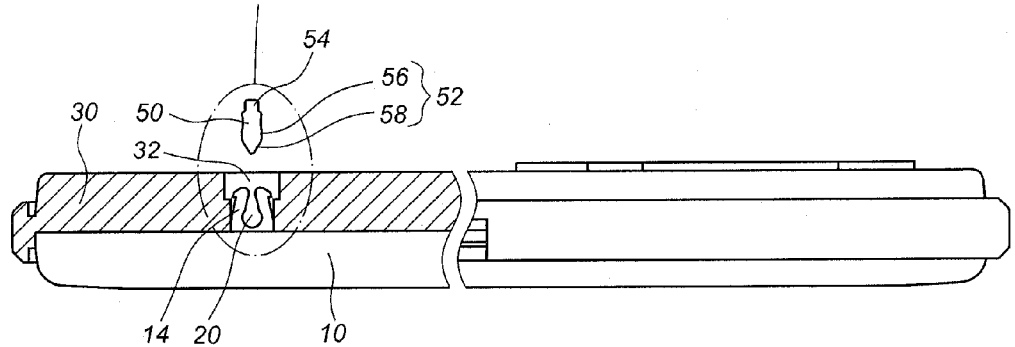
FIG. 3 is a partial cross sectional view to show that the positioning member is to be inserted into the space of the engaging member.
Figure 4:
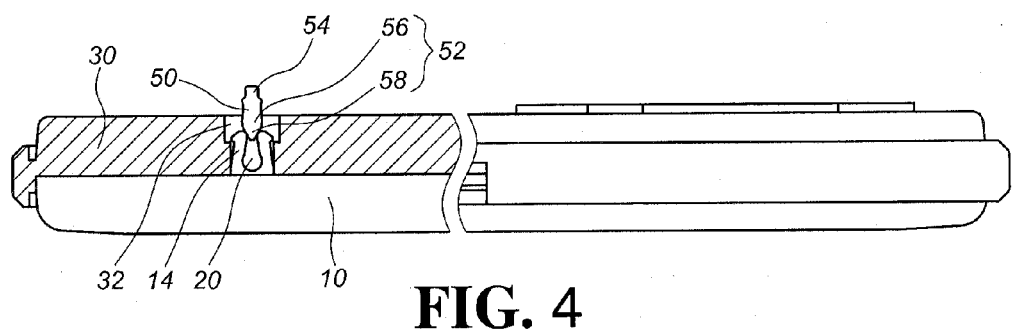
FIG. 4 is a partial cross sectional view to show that the positioning member begins to be inserted into the space of the engaging member.
Figure 5:
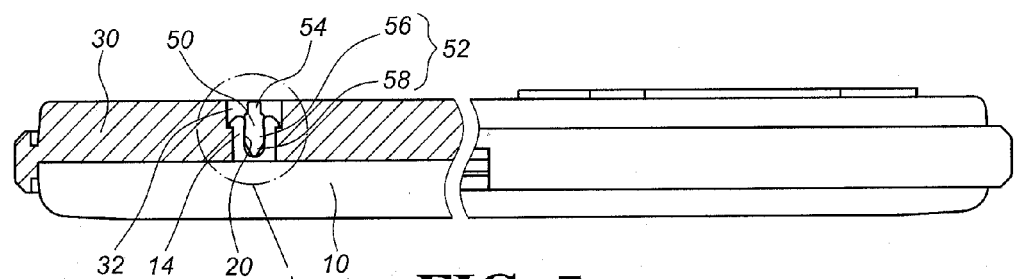
FIG. 5 is a partial cross sectional view to show that the positioning member is inserted into the space of the engaging member.
Figure 5A:
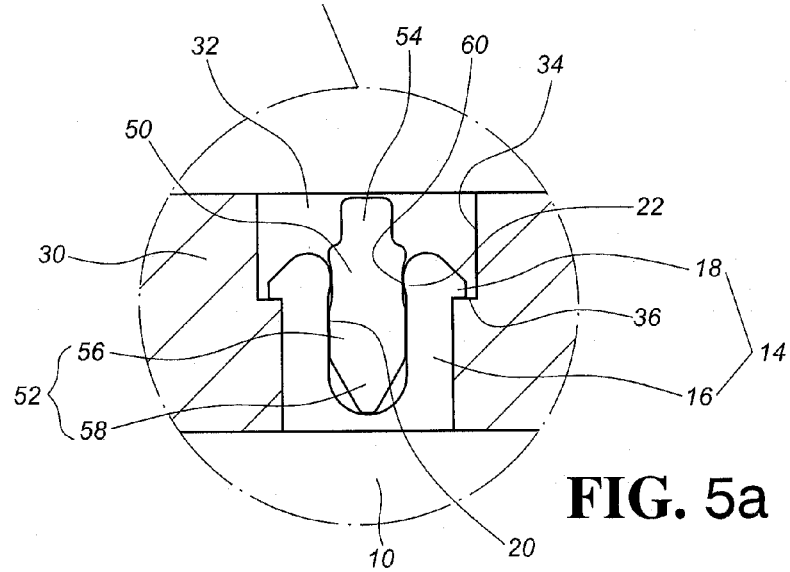
FIG. 5a is an enlarged view to show the circled portion in FIG. 5.

Referring to FIGS. 3 to 5, when assembling, because of the width of each of the ports 32 in the second case 30 is larger than the width between the two respective outsides of the two protruding portions 18 of the clamping protrusions 14, so that the clamping protrusions 14 are easily inserted into the ports 32 without any resistance. The gradually-narrowed portion 58 of the positioning member 50 is easily inserted into the space 20 and the clamping protrusions 14 are expanded outward by the positioning member 50, and the protruding portions 18 are engaged on the shoulder 36 of the second case 30. Besides, the protrusions 22 on the clamping protrusions 14 are engaged with the recesses 60 of the straight portion 56 so as to position the positioning member 50, as shown in FIG. 5a.

The first and second cases 10, 30 are easily assembled and an interior space is defined between the first and second cases 10, 30 so as to accommodate electronic parts such as communication modules.

When disassembling the first and second cases 10, 30, because the length of the positioning member 50 is longer than the depth of the space 20, so that the head 54 of the positioning member 50 is exposed outside the space 20 and the user can pull the head 54 away from the space 20 to remove the positioning member 50. The clamping protrusions 14 then bounce toward each other and the protruding portions 18 are disengaged from the shoulder 36. The first and second cases 10, 30 are separated from each other.

There does not need any tool, especially a screwdriver to assemble or disassemble the first and second cases 10, 30, which saves a lot of time. Furthermore, because the engaging members 12 can be easily inserted into the ports 32 so that the first and second cases 10, 30 do not shake or vibrate during assembling and the electronic parts are not affected by vibration due to assembling process of the first and second cases 10, 30.

While we have shown and described the embodiment in accordance with the present invention, it should be clear to those skilled in the art that further embodiments may be made without departing from the scope of the present invention.

What is claimed is:

1. A case assembly for electronic appliance, comprising:
    a first case having a plurality of engaging members and each engaging member having two clamping protrusions which are located apart from each other, each clamping protrusion including a supporting portion and a protruding portion which extends laterally from the supporting portion, a space defined between the two clamping protrusions, the protruding portions of the clamping protrusions defining an opening of the space;
    a second case connected to the first case and an interior space defined between the first and second cases, the second case including a plurality of ports defined therethrough which are located corresponding to the engaging members, each port having a shoulder defined in an inside thereof and the shoulder located corresponding to the protruding portions of the clamping protrusions, and
    a plurality of positioning members each having an insertion portion and a head opposite to the insertion portion, an transverse width of the opening of the space being smaller than a width of the insertion portion, the insertion portion of each of the positioning members being inserted into the space corresponding thereto and the clamping protrusions being expanded outward by the positioning member, the protruding portions being engaged on the shoulder of the second case.

2. The case assembly as claimed in claim 1, wherein the two clamping protrusions are inclined an angle toward each other.

3. The case assembly as claimed in claim 1, wherein the insertion portion of each of the positioning members includes a straight portion and a gradually-narrowed portion which extends from the straight portion, the gradually-narrowed portion is located corresponding to the space between the two clamping protrusions corresponding thereto, a minimized width of the gradually-narrowed portion is smaller than the transverse width of the opening of the space.

4. The case assembly as claimed in claim 3, wherein each of the clamping protrusions has a protrusion which is located to the opening of the space corresponding thereto, the straight portion of each of the insertion portions includes a recess which is located corresponding to the protrusion of the clamping protrusion, the protrusions of the clamping protrusion are engaged with the recesses when the positioning member is inserted into the space.

5. The case assembly as claimed in claim 1, wherein the clamping protrusions are made of flexible material and extend from the first case.

6. The case assembly as claimed in claim 1, wherein the width of each of the ports in the second case is larger than the width between two respective outsides of the two protruding portions the clamping protrusions.

7. A case assembly for electronic appliance, comprising:
    a first case having two clamping protrusions located apart from each other, each clamping protrusion including a supporting portion and a protruding portion which extends laterally from the supporting portion, a space defined between the two clamping protrusions, the protruding portions of the clamping protrusions defining an opening of the space;
    a second case including a port defined therethrough which is located corresponding to the clamping protrusions, the port having a shoulder defined in an inside thereof and the shoulder located corresponding to the protruding portions of the clamping protrusions, and
    a positioning member having an insertion portion and a head opposite to the insertion portion, an transverse width of the opening of the space being smaller than a width of the insertion portion, the insertion portion of the positioning member being inserted into the space and the clamping protrusions being expanded outward by the positioning member, the protruding portions being engaged on the shoulder of the second case.

8. The case assembly as claimed in claim 7, wherein the two clamping protrusions are inclined an angle toward each other.

9. The case assembly as claimed in claim 7, wherein the insertion portion of the positioning member includes a straight portion and a gradually-narrowed portion which extends from the straight portion, the gradually-narrowed portion is located corresponding to the space between the two clamping protrusions, a minimized width of the gradually-narrowed portion is smaller than the transverse width of the opening of the space.

10. The case assembly as claimed in claim 9, wherein each of the clamping protrusions has a protrusion which is located to the opening of the space, the straight portion of the insertion portion includes a recess which is located corresponding to the protrusion of the clamping protrusion, the protrusions of the clamping protrusion are engaged with the recesses when the positioning member is inserted into the space.

11. The case assembly as claimed in claim 7, wherein the clamping protrusions are made of flexible material and extend from the first case.

12. The case assembly as claimed in claim 7, wherein the width of the port in the second case is larger than the width between two respective outsides of the two protruding portions the clamping protrusions.

* * * * *